UNITED STATES PATENT OFFICE.

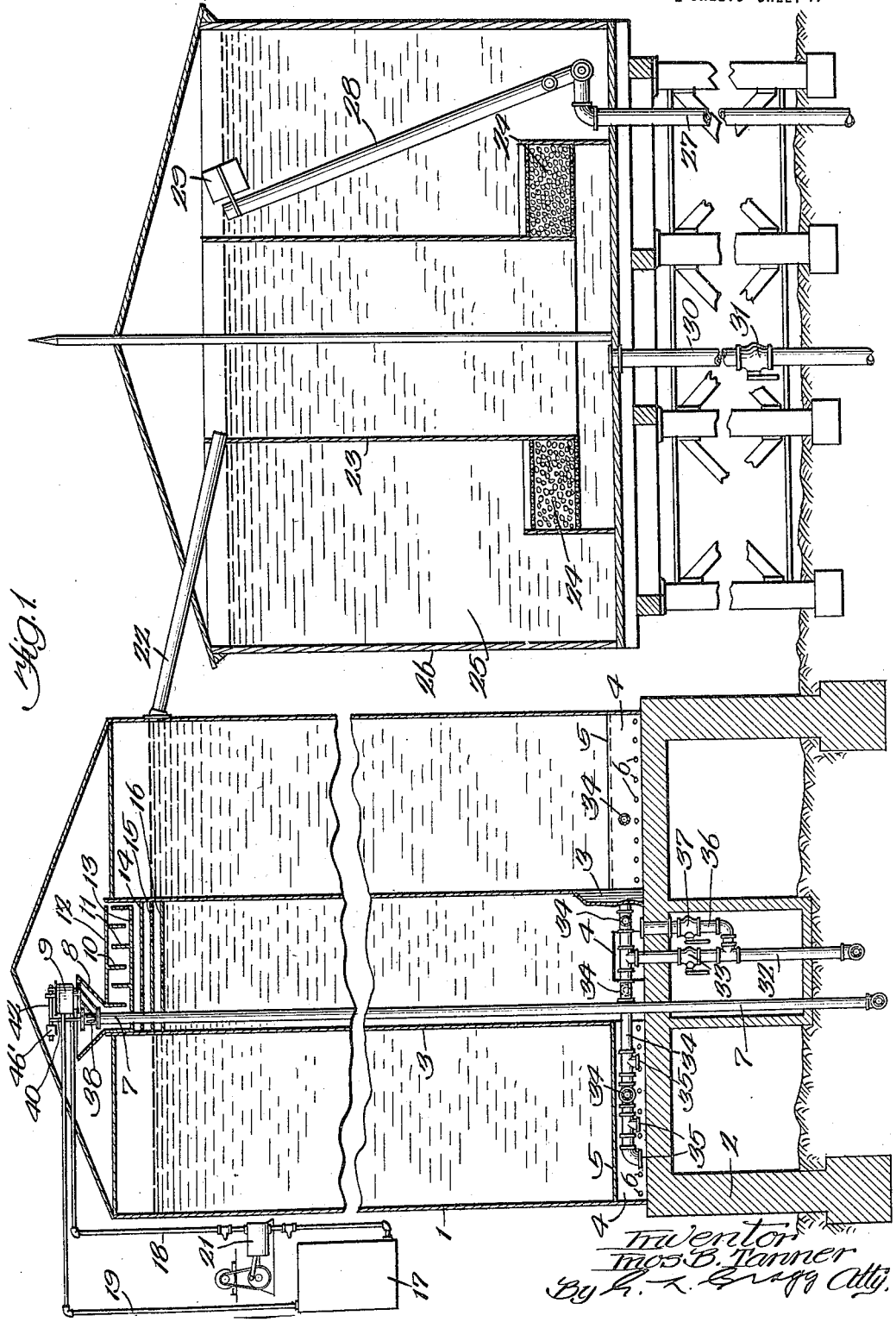

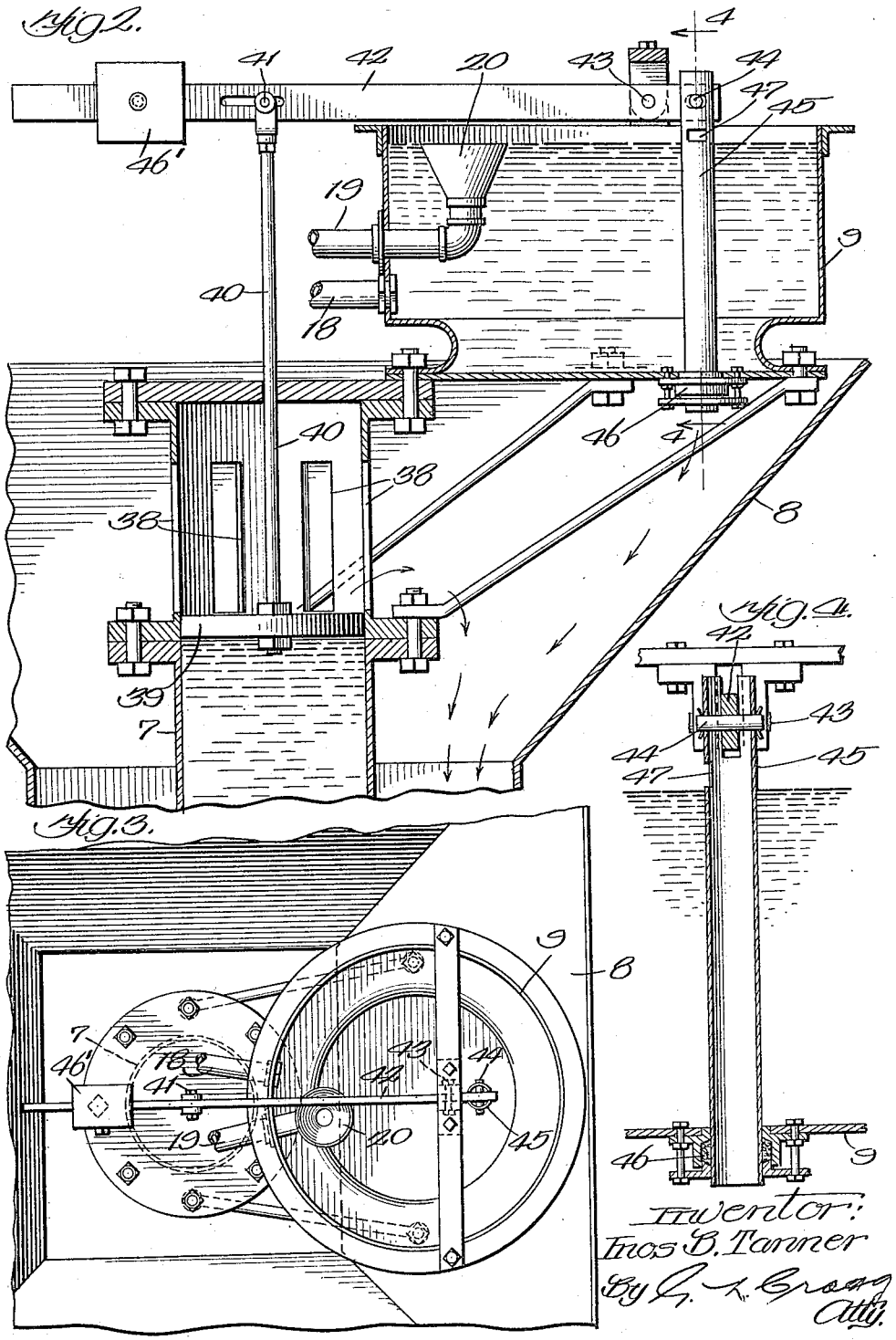

INOS B. TANNER, OF CHICAGO, ILLINOIS, ASSIGNOR TO JOS. E. NELSON & SONS, OF CHICAGO, ILLINOIS, A COPARTNERSHIP.

LIQUID-TREATING APPARATUS.

1,407,499.  Specification of Letters Patent.  Patented Feb. 21, 1922.

Application filed July 23, 1921. Serial No. 487,122.

*To all whom it may concern:*

Be it known that I, INOS B. TANNER, citizen of the United States, residing at Chicago, in the county of Cook and State of Illinois, have invented a certain new and useful Improvement in Liquid-Treating Apparatus, of which the following is a full, clear, concise, and exact description.

My invention relates to liquid treating apparatus and is of particular service in the softening of water to prepare it for industrial use.

My invention has for its object the provision of improved means for maintaining a selected proportion between the water and chemical flowing into a settling chamber at varying rate.

In carrying out my invention I employ a settling chamber, a chemical tank, a source of liquid under pressure, a pipe through which the liquid passes into the settling chamber for treatment, a chemical pipe also discharging into the settling chamber and having a port in its side through which chemical passes from the chemical tank into the pipe, a valve within the liquid pipe and controlling ports in said pipe and rising and falling according to the pressure of the liquid, and mechanism governed by said valve and governing the height of the chemical pipe, whereby the varying volumes of water and chemical will be in fixed proportion to secure the required reaction between the chemical and the materials that are to be precipitated out of the liquid. Water may readily be softened by means of such an equipment having the characteristics of my invention.

I will explain my invention more fully in connection with the accompanying drawings showing the preferred embodiment thereof and in which Fig. 1 is a view illustrating a water softening plant, parts being shown in sectional elevation and a portion of the figure being diagrammatic; Fig. 2 is a sectional elevation of a part of the equipment shown in Fig. 1 but on a larger scale; Fig. 3 is a plan view, on a smaller scale, of the equipment portion shown in Fig. 2; and Fig. 4 is a sectional view on line 4—4 of Fig. 3.

Like parts are indicated by similar characters of reference throughout the different figures.

The equipment will first be generally described whereafter the features thereof constituting my invention will be more particularly set forth.

The tank 1 is of any suitable formation and is supported in any suitable manner, as upon a foundation 2. It is provided with a central settling chamber 3, which may be in the form of a stand pipe resting upon the foundation. This chamber has no communication with the tank space surrounding it, except through the passages 4 which are formed in and beneath the tank bottom 5, the side walls of these passages being perforated as indicated at 6 to permit treated water that descends through the settling chamber to pass into the surrounding chamber that thus constitutes a treated water chamber.

The water to be treated is supplied from the city mains or from any other suitable source and flows through the riser 7 that may pass upwardly through the settling chamber to the place where the raw water is to be discharged into such chamber. This chamber is provided with a continuation in the form of a funnel 8 at the upper end of the chamber.

As will be more fully hereinafter set forth, the water passing from the pipe 7 into the settling chamber 3 controls the flow of chemical from the chemical tank 9 into the funnel 8 so that the chemical will flow in quantity proportional to the amount of raw water discharged into said funnel. The mixture of water and chemical is initiated in the funnel and is promoted by the upright perforated interleaved baffle plates 10, 11 carried by the horizontal imperforate passage walls 12, 13 and the horizontal perforated baffle plates 14, 15, 16 that extend in all directions to the pipe 3 that supports them. The baffle plates form a part of the subject matter of my co-pending application Serial No. 487,121, filed July 23, 1921.

The chemical is supplied to the chemical tank from a chemical supply tank 17 which discharges into the chemical tank through the supply pipe 18, and which supply tank receives unemployed chemical back from the chemical tank through the return pipe 19. The chemical is preferably maintained at a fixed level within the chemical tank 9 by terminating the return pipe 19 at the selected level, this end of the pipe being desirably in the form of a receiving funnel 20.

A pump 21 may be inserted in the pipe 18 to force the flow of the chemical. The softened water finds passage through the perforations 6 in the side walls of the passages 4 and into the softened water chamber in the tank 1 that surrounds the settling chamber 3. An outlet pipe 22 connects the top portion of the softened water chamber with the top end of the upright chamber 23. This chamber discharges, at its lower end, into the space beneath the filters 24 through which the softened water passes into the soft water supply chamber 25. The chamber 25 is formed between the chamber 23 and the tank 26 in which the chamber 23 and the filters 24 are disposed. The filtered water is discharged from the tank 25 through a discharge pipe 27 having a swinging section 28 whose receiving end is held at the upper level of the filtered softened water by means of a float 29 attached to the upper end of this swinging pipe section.

The impurities intercepted by the filter from the softened water flowing therethrough may be discharged through the discharge pipe 30 when the valve 31 in this pipe is opened to permit the water from chamber 23 to flow downwardly very rapidly to wash away the collected impurities. Water in chamber 25 then also passes backwardly through the filter to cleanse it.

As set forth in my aforesaid co-pending application, the sludge or precipitate resulting from the water softening process may be discharged through the pipe 32 when the valve 33 therein is opened. This discharge pipe has receiving branches 34 in the passages 4. These receiving branches are each provided with a number of receiving mouths 35 distributed along the same. The pipe 32 has another branch 36 terminating within and at the bottom of the settling chamber 3, this branch pipe being connected with pipe 32 below valve 33. A valve 37 is in the branch 36. When it is desired to discharge the water without effecting material removal of the sludge, valve 37 is alone opened. When the sludge is to be removed both valves may be opened, or valve 33 may alone be opened.

Reference will now be made more particularly to Figs. 2, 3 and 4 which most clearly illustrate the portion of the equipment forming the subject matter of my present application.

The upper end of pipe 7 is provided with weir ports 38 that are elongated lengthwise of the pipe. A weighted valve 39 has a range of movement extending through the zone of said ports and slightly on either side thereof, the valve functioning to completely close said pipe and to fully open said ports or partially open the same, depending upon the head or pressure of the water flowing upwardly in said pipe. Valve 39 has an upwardly extending stem 40 having pin and slot connection 41 at its upper end with a lever 42 fulcrumed at 43 between its ends and very near that end which is in pin and slot connection 44 with the upper end of an upright pipe 45 that passes through and is in sliding relation to the bottom of the chemical tank 9, there being a stuffing box 46 in said tank bottom through which the pipe 45 may slide. This pipe discharges the chemical into the funnel 8. The end of the lever 42 that is adjacent the valve stem 40 is provided with a weight 46' to sufficiently offset the weight of the pipe 45. This pipe has a port 47 in the region of the upper level of the chemical in the tank 9. The pressure exerted by the heavy valve 39 upon the water in the pipe 7 counteracts the pressure of this water upon the valve sufficiently to enable the valve to control the position of the pipe 45 and its port 47. The arrangement and operation of these parts is such that when the bottom of the valve is below the bottom of the ports 38 that the bottom of the port 47 is above the chemical in tank 9. When the bottom of said valve is above the bottom of the ports controlled thereby, the bottom of the port 47 is below the upper level of the chemical. The ports are so proportioned and interrelated that the amount of water passing through the ports 38 and the amount of chemical flowing through port 47 into pipe 45 and through said pipe into the funnel 8 are in fixed proportion, the volume of chemical flowing through the pipe increasing or decreasing with any increase or decrease of the flow of water. The water and chemical, in varying volume but in fixed proportion, are initially received in the funnel 8 from which they are passed to the channel containing the baffles 10 and 11 and from this channel through the perforated baffles 14, 15, 16 as hitherto fully described.

While I have herein shown and particularly described the preferred embodiment of my invention I do not wish to be limited to the precise details of construction shown as changes may readily be made without departing from the spirit of my invention, but having thus described my invention I claim as new and desire to secure by Letters Patent the following:—

1. Liquid treating apparatus including a source of liquid furnishing liquid to be treated under pressure; a pipe communicating with said source; a valve in said pipe operated by the liquid, the pipe having a port closed by said valve and also opened to varying extents by the valve according to the pressure exerted upon the valve by the liquid; a settling chamber into which the liquid to be treated is discharged through said port; a chemical tank; and a chemical pipe movable up and down and having a port at one end near the level of the chemical in the chemical tank and communicating with the chemical tank to receive chemical therethrough, said chemical pipe discharging at its other end into the settling chamber, said chemical pipe being connected with the aforesaid valve to increase the extent of the port in the chemical pipe through which chemical may flow as said valve increases the extent of the liquid port through which liquid to be treated may flow, the parts being arranged to maintain substantially fixed proportion of liquid and chemical irrespective of the rate at which they flow.

2. Liquid treating apparatus including a source of liquid furnishing liquid to be treated under pressure; a pipe communicating with said source; a valve in said pipe operated by the liquid, the pipe having a port closed by said valve and also opened to varying extents by the valve according to the pressure exerted upon the valve by the liquid; a settling chamber into which the liquid to be treated is discharged through said port; a chemical tank; and a chemical pipe in the chemical tank and movable up and down therein and having a port at one end near the level of the chemical in the chemical tank, said chemical pipe discharging at its other end into the settling chamber, this other end of the chemical pipe passing through a wall in the chemical tank and being in sliding relation thereto, said chemical pipe being connected with the aforesaid valve to increase the extent of the port in the chemical pipe through which chemical may flow as said valve increases the extent of the liquid port through which liquid to be treated may flow, the parts being arranged to maintain substantially fixed proportion of liquid and chemical irrespective of the rate at which they flow.

3. Liquid treating apparatus including a source of liquid furnishing liquid to be treated under pressure; a pipe communicating with said source; a valve in said pipe operated by the liquid, the pipe having a port closed by said valve and also opened to varying extents by the valve according to the pressure exerted upon the valve by the liquid; a settling chamber into which the liquid to be treated is discharged through said port; a chemical tank; a chemical pipe movable up and down and having a port at one end near the level of the chemical in the chemical tank and communicating with the chemical tank to receive chemical therethrough, said chemical pipe discharging at its other end into the settling chamber; and lever mechanism connecting said valve and chemical pipe to increase the extent of the port in the chemical pipe through which chemical may flow as said valve increases the extent of the liquid port through which liquid to be treated may flow, the parts being arranged to maintain substantially fixed proportion of liquid and chemical irrespective of the rate at which they flow.

4. Liquid treating apparatus including a source of liquid furnishing liquid to be treated under pressure; a pipe communicating with said source; a valve in said pipe operated by the liquid, the pipe having a port closed by said valve and also opened to varying extents by the valve according to the pressure exerted upon the valve by the liquid; a settling chamber into which the liquid to be treated is discharged through said port; a chemical tank; and a chemical pipe in the chemical tank and movable up and down therein and having a port at one end near the level of the chemical in the chemical tank, said chemical pipe discharging at its other end into the settling chamber, this other end of the chemical pipe passing through a wall in the chemical tank and being in sliding relation thereto; and lever mechanism connecting said valve and chemical pipe to increase the extent of the port in the chemical pipe through which chemical may flow as said valve increases the extent of the liquid port through which liquid to be treated may flow, the parts being arranged to maintain substantially fixed proportion of liquid and chemical irrespective of the rate at which they flow.

In witness whereof, I hereunto subscribe my name this 15th day of July, A. D. 1921.

INOS B. TANNER.